United States Patent [19]

Kasugai

[11] Patent Number: 4,906,989
[45] Date of Patent: Mar. 6, 1990

[54] PAGING SYSTEM HAVING A VEHICLE MOUNTED REPEATER WITH A PORTABLE PAGING RECEIVER DETACHABLY MOUNTED THEREON

[75] Inventor: Teruaki Kasugai, Tokyo, Japan

[73] Assignee: NEC Corporation, Tokyo, Japan

[21] Appl. No.: 385,958

[22] Filed: Jul. 28, 1989

Related U.S. Application Data

[63] Continuation of Ser. No. 161,814, Feb. 29, 1988, abandoned.

[30] Foreign Application Priority Data

Feb. 27, 1987 [JP] Japan ................................. 62-44639

[51] Int. Cl.4 .............................................. H04B 7/26
[52] U.S. Cl. ............................... 340/825.440; 329/56; 455/11; 455/89
[58] Field of Search ................... 340/825.44, 311.1; 379/56, 58, 61, 62, 63, 170; 455/11, 15, 53, 54, 89, 95, 96, 99, 100

[56] References Cited

U.S. PATENT DOCUMENTS

| | | | |
|---|---|---|---|
| 3,736,591 | 5/1973 | Rennels et al. | 455/351 |
| 4,056,779 | 11/1977 | Toler | 455/11 |
| 4,559,706 | 9/1985 | Mears et al. | 455/54 |
| 4,627,107 | 12/1986 | Hohlfeld et al. | 455/11 |
| 4,661,972 | 4/1987 | Kai | 340/825.44 |
| 4,700,375 | 10/1987 | Reed | 379/61 |
| 4,803,487 | 2/1989 | Willard et al. | 455/11 |

FOREIGN PATENT DOCUMENTS

| | | | |
|---|---|---|---|
| 0134852 | 10/1981 | Japan | 455/11 |
| 2177244 | 1/1987 | United Kingdom | 340/825.48 |
| 8808649 | 11/1988 | World Int. Prop. O. | 455/11 |

*Primary Examiner*—Donald J. Yusko
*Assistant Examiner*—Eric Pudpud
*Attorney, Agent, or Firm*—Sughrue, Mion, Zinn, Macpeak & Seas

[57] ABSTRACT

A paging system allows an on-board radio unit of a vehicle telephone for business use to serve as a repeater as needed. An on-board repeater is mounted on the same vehicle as the on-board radio unit while a portable unit is removably mounted on the repeater. When the portable unit is removed from the on-board repeater, the on-board radio unit functions as a repeater. Even when a person who uses the vehicle on which the telephone is mounted is away from the vehicle with the portable unit, a desired voice message can be transferred to the person immediately.

2 Claims, 4 Drawing Sheets

PAGING SYSTEM HAVING A VEHICLE MOUNTED REPEATER WITH A PORTABLE PAGING RECEIVER DETACHABLY MOUNTED THEREON

This is a continuation of application Ser. No. 07/161,814 filed Feb. 29, 1988, abandoned.

BACKGROUND OF THE INVENTION

The present invention relates to a paging system and, more particularly, to a paging system in which a mobile or on-board radio unit of a vehicle telephone for business use may function as a repeater as needed.

As is well known in the art, a vehicle telephone for business use includes a central radio station and mobile radio units which are individually mounted on vehicles. The central station transmits a particular call signal to a desired one of the mobile units over a radio channel and, thereafter, a communication is held between the two remote stations. When a call from the central station is received by the mobile unit while a person who is expected to operate the vehicle is away from the vehicle, a call lamp provided on the mobile unit is turned on to allow the person to see the call and, then, take any necessary action when he or she returns to the vehicle.

On the other hand, a paging system is implemented with a central radio station and portable receivers which may individually receive call signals from the central station. Any of the receivers which has received a call signal and determined that the call is meant therefor drives a speaker or the like to alert a user of the receiver to the call by an audible connect tone. Some of the modern paging systems proposed are capable of transferring even voice messages to the users of such portable receivers.

Assuming a salesman who is engaged in sales activities aided by a vehicle on which a telephone for business use is mounted, connection may eventually be established between the central radio station and the salesman even if the salesman is away from the vehicle. However, this is unachievable unless the salesman returns to the vehicle and, therefore, lacks in rapidity or directness. An implementation which may be contemplated to solve such a problem is providing the salesman with a portable receiver of a paging system. This implementation, however, brings about another problem that a call cannot be perceived by the salesman without needing two consecutive and troublesome steps, i.e., calling up the salesman who is expected to be in the vehicle by a vehicle telephone procedure and, if the salesman is absent in the vehicle, calling him or her up again by a paging procedure which is different from the vehicle telephone procedure.

SUMMARY OF THE INVENTION

It is, therefore, an object of the present invention to provide a paging system which allows a voice message to be transferred rapidly or directly to a person who is expected to operate a vehicle on which a telephone for business use is mounted, even if the person is away from the vehicle.

It is another object of the present invention to provide a generally improved paging system.

A paging system of the present invention comprises a central radio station for collectively controlling the system, an on-board radio unit connected to the central radio station by a first channel to receive a call signal and a voice message from the central radio station while transmitting to the central radio station an absence answer signal and a repeat start signal which are directly inputted to the on-board radio unit, an on-board repeater electrically connected to the on-board radio unit and mounted on the same vehicles as the on-board radio unit, and a portable unit removably mounted on the on-board repeater and, when removed from the repeater to be carried, connected to the repeater by a second channel which is different from the first channel.

In accordance with the present invention, a paging system allows an on-board radio unit of a vehicle telephone for business use to serve as a repeater as needed. An on-board repeater is mounted on the same vehicle as the on-board radio unit while a portable unit is removably mounted on the repeater. When the portable unit is removed from the on-board repeater, the on-board radio unit functions as a repeater. Even when a person who uses the vehicle on which the telephone is mounted is away from the vehicle with the portable unit, a desired voice message can be transferred to the person immediately.

BRIEF DESCRIPTION OF THE DRAWINGS

The above and other objects, features and advantages of the present invention will become more apparent from the following detailed description taken with the accompanying drawings in which:

FIGS. 6A and 6B are timing charts representative of the operation of the portable unit.

DESCRIPTION OF THE PREFERRED EMBODIMENT

Figure 1:
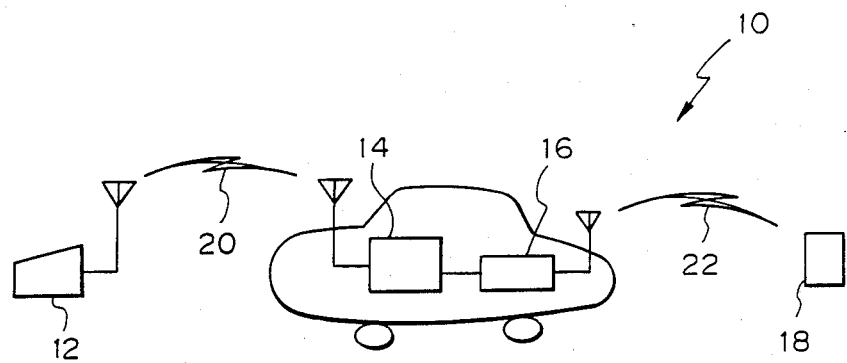
FIG. 1 is a schematic block diagram showing a paging system embodying the present invention.

Referring to FIG. 1 of the drawings, a paging system embodying the present invention is shown and generally designated by the reference numeral 10. As shown, the paging system 10 includes a central radio station 12, an on-board radio unit 14, an on-board repeater 16, and a portable unit 18. The on-board radio unit 14, repeater 16 and the portable unit 18 constitute a mobile radio system in combination. The central station 12 and the on-board unit 14 are interconnected by a radio channel 20, so that a call signal and a voice message may be transmitted from the central station 12 to the on-board unit 14. This is well known in the art in relation to a vehicle telephone system for business use and, therefore, details thereof will not be described for simplicity. What characterizes the present invention is that the on-board unit 14 serves as a repeater for interconnecting the central station 12 and the on-board repeater 16 as needed. To implement such a repeater function of the unit 14, signals are directly interchanged between the unit 14 and the repeater 16. Specifically, the on-board unit 14 delivers to the repeater 16 a call receive signal and a receiver signal which are representative of, respectively, a call and a voice message which are sent from the central station 12. Also, the on-board unit 14 receives a press signal (i.e., a transmission start signal); and and a microphone signal (i.e., a modulating signal) from the repeater 16 and transmits the microphone signal to the central station 12.

Figure 2:
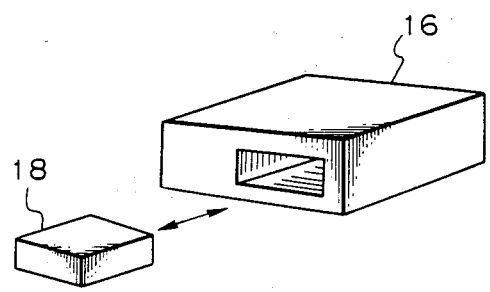
FIG. 2 is a perspective view representative of a relationship between an on-board repeater and a portable unit associated therewith.

The on-board repeater 16 is electrically connected to the on-board unit 14 and mounted on the same vehicle. As shown in FIG. 2, the portable unit 18 is removably mounted on the repeater 16. When the portable unit 18 is removed from the repeater 16 and carried away from the vehicle, it is connected to the repeater 16 by a radio channel 22 which is different from the previously stated channel 20.

Figure 3:
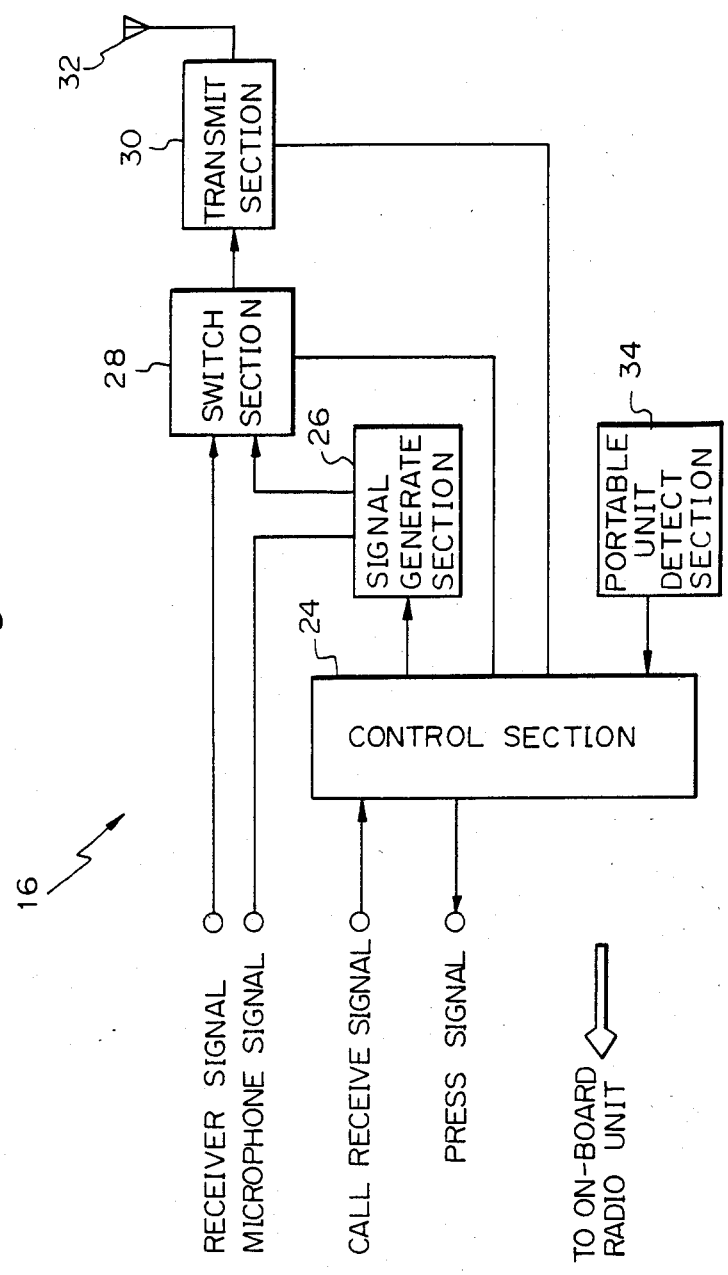
FIG. 3 is a block diagram schematically showing a specific construction of the on-board repeater.
Figure 4:
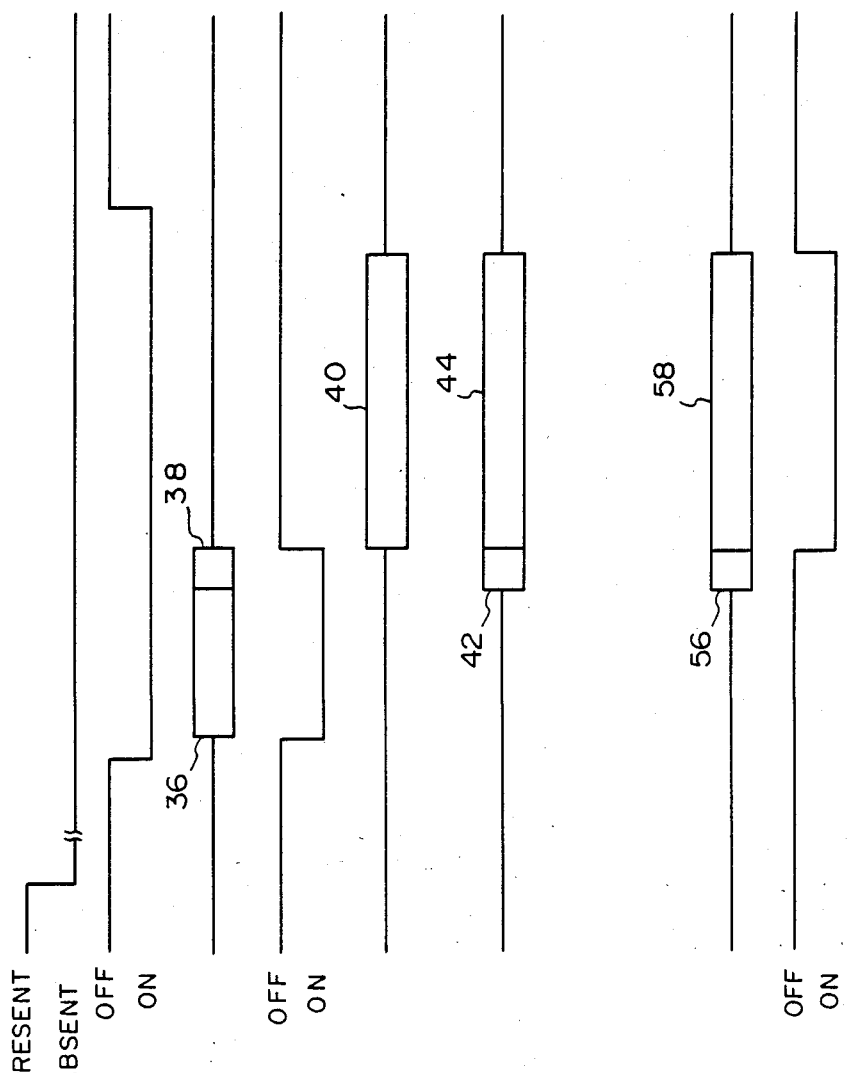
FIGS. 4A to 4F are timing charts demonstrating the operation of the on-board repeater.

Referring to FIG. 3, a specific construction of the on-board repeater 16 is shown. The repeater 16 is generally constituted by a control section 24, a signal generating section 26, a switching section 28, a transmitting section 30, an antenna 32, and a portable unit detecting section 34. The portable unit detecting section 34 delivers to the control section 24 a signal which is representative of the presence/absence of the portable unit 18 on the repeater 16. For example, as shown in FIG. 4A, the detecting section 34 produces an output which is logical ONE when the portable unit 18 is present on the repeater 16 and logical ZERO when it is absent.

In detail, in response to a call receive signal from the on-board unit 14, the control section 24 of the repeater checks the output level of the portable unit detecting section 34 and, if it is ONE, does not perform any operation as in a conventional vehicle telephone for business use. On the other hand, when a call receive signal, FIG. 4B, is applied from the on-board unit 14 to the repeater 16 while the output level of the detecting section 34 is ZERO, the control section 24 energizes the signal generating section 26 causing it to generate an absence answer signal 36 and a repeat start signal 38 (See FIG. 4C) and a call signal 42 (See FIG. 4F). Simultaneously, the control section 24 turns ON a press signal, FIG. 4D, and generates a microphone signal, FIG. 4C, the press signal and microphone signal being fed to the on-board unit 14.

The microphone signal consists of the previously stated absence answer signal and repeat start signal. As shown in FIG. 4C, the absence answer signal 36 is sent first and, then, the repeat start signal 38. At the same time, the control section 24 connects the switching section 28 to the signal generating section 26 while controlling the transmitting section 30. As a result, the call signal 42 outputted by the signal generating section 26 is transmitted through the antenna 32 to the portable unit 18 over the channel 22. Subsequently, the control section 24 actuates the switching section 28 into connection with the on-board unit 14 while controlling the transmitting section 30. This causes the receiver signal, i.e., voice message 40 applied from the unit 14 to be transmitted, as a voice message 44, to the portable unit 18 over the channel 22 (see FIG. 4E). Hence, the signal received by the portable unit 18 consists of the call signal 42 and the voice message 44, as shown in FIG. 4F.

The on-board repeater 16 is disenabled when the call signal from the on-board unit 14 becomes OFF, when a timer built in the control section 24 counts up a predetermined period of time, or the like.

Figure 5:
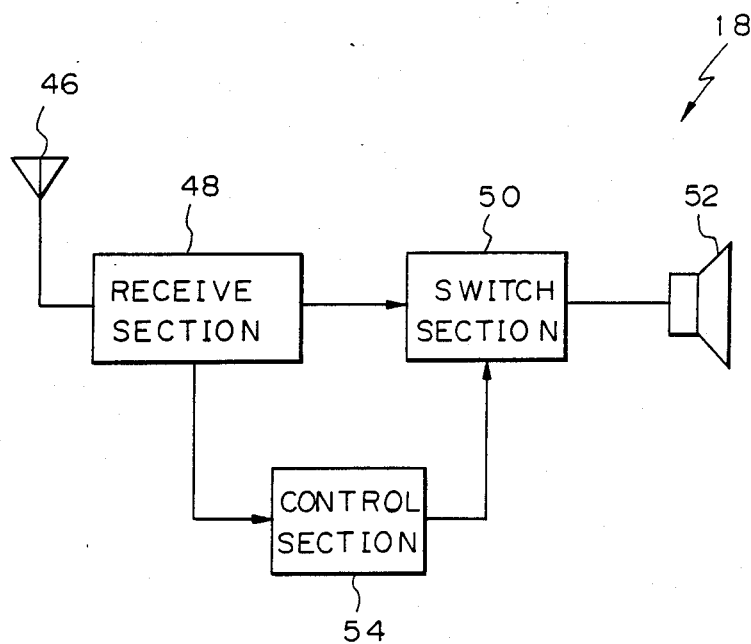
FIG. 5 is a schematic block diagram showing a specific construction of the portable unit.

As shown in FIG. 5, the portable unit 18 includes an antenna 46, a receiving section 48, a switch section 50, a speaker 52, and a control section 54. The call signal 56 and voice message 58 which constitute a received signal, FIG. 6A, and come in through the antenna 46 are demodulated by the receiving section 48, the call signal 56 being fed to the control section 54 first. The call signal 56 and the voice message 58 correspond to the call signal 42 and the voice message 44, respectively. In response, the control section 54 decodes the call signal 56 and, if it is meant for the own unit, controls the switch section 50 to connect the receiving section 48 to the speaker 52. Consequently, the voice message 58 which follows the call signal 56 is applied from the receiving section 48 to the speaker 52 resulting that the voice message is produced through the speaker 52 (see FIG. 6B).

With the above construction, the paging system in accordance with the present invention allows a voice message to be promptly transferred to a salesman or the like who is away from the vehicle with the portable unit 18. A timer is installed in the control section 54 so that the portable unit 18 may be disenabled upon the lapse of a predetermined period of time.

In summary, it will be seen that the present invention provides a paging system which is capable of transferring a desired voice message to a person, who is expected to use a vehicle telephone for business purposes, promptly or immediately without resorting to the conventional troublesome procedure even if he or she is away from a vehicle on which the telephone is mounted. This unprecedented advantage is derived from a unique arrangement wherein an on-board radio unit and an on-board repeater are mounted on the same vehicle with a portable unit removably mounted on the repeater, the on-board unit serving as a repeater when the portable unit is removed from the on-board repeater. Another advantage attainable with the present invention is that a desired paging system can be constructed simply by mounting the on-board repeater with the portable unit in the same vehicle as the on-board radio unit.

Various modifications will become possible for those skilled in the art after receiving the teachings of the present disclosure without departing from the scope thereof.

What is claimed is:

1. A paging system comprising:
   a central radio station for collectively controlling said system;
   an on-board radio unit connected to said central radio station by a first channel to receive a first call signal and a voice message from said central radio station, said on-board radio unit being operable for transmitting information to said central radio station via said first channel;
   an on-board repeater electrically connected to said on-board radio unit and mounted on the same vehicle as said on-board radio unit, said on-board repeater having means for generating said information and for supplying said generated information to said on-board radio unit; and
   a portable unit removably mounted on said on-board repeater and, when removed from said repeater to be carried, connected to said repeater by a second channel which is different from said first channel, wherein said information generated by said on-board repeater and transmitted by said on-board radio to said central radio station comprises an absence answer signal indicating that said portable unit is not mounted on said on-board repeater, and a repeat start signal indicating that said on-board repeater has started transmitting said voice message to said portable unit via said second channel, and wherein said on-board repeater comprises:

detector means for detecting whether or not said portable unit is mounted on said on-board repeater;

signal generating means for generating said absence answer signal and said repeat start signal, and for generating a second call signal which is meant for said portable unit; and control means for, when said portable unit is not mounted on said on-board repeater, responding to a call receive signal, which said on-board radio unit produces in response to said first call signal, by controlling said signal generating means to send said absence answer signal and said repeat start signal to said on-board radio unit for transmission to said central radio station via said first channel while, at the same time, sending said second call signal to said portable unit, said control means also sending said voice message to said portable unit.

2. A paging system as claimed in claim 1, wherein said portable unit comprises control means for decoding said second call signal received and, if said second call signal is meant for said portable unit, causing a speaker to produce said voice message which is received after said call signal.

* * * * *